US008194567B2

(12) United States Patent
Erwin et al.

(10) Patent No.: US 8,194,567 B2
(45) Date of Patent: Jun. 5, 2012

(54) SYSTEM AND METHOD FOR ESTABLISHING A WIRELESS MESH NETWORK USING MULTIPLE FREQUENCY BANDS

(75) Inventors: Jeffrey Baird Erwin, Sammamish, WA (US); Stephen Thomas Kelly, Redmond, WA (US); John Ian Ferrell, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 744 days.

(21) Appl. No.: 10/962,383

(22) Filed: Oct. 9, 2004

(65) Prior Publication Data

US 2006/0077985 A1    Apr. 13, 2006

(51) Int. Cl.
H04L 12/28    (2006.01)
H04L 12/56    (2006.01)
H04J 3/16     (2006.01)
H04J 3/22     (2006.01)

(52) U.S. Cl. .................. 370/254; 370/400; 370/465
(58) Field of Classification Search .................. None
See application file for complete search history.

(56) References Cited

U.S. PATENT DOCUMENTS

| | | | |
|---|---|---|---|
| 6,212,405 B1 * | 4/2001 | Jiang et al. | 455/561 |
| 6,850,502 B1 * | 2/2005 | Kagan et al. | 370/330 |
| 7,099,673 B2 * | 8/2006 | Yamashita | 455/452.2 |
| 2006/0067283 A1 * | 3/2006 | So et al. | 370/338 |
| 2006/0217062 A1 * | 9/2006 | Saffre et al. | 455/11.1 |

* cited by examiner

*Primary Examiner* — Gregory Sefcheck
*Assistant Examiner* — Suk Jin Kang
(74) *Attorney, Agent, or Firm* — Merchant & Gould (57) ABSTRACT

A mesh network is initiated by using multiple frequency bands for establishing communication between mesh nodes. In one aspect, a higher or lower frequency communication link may be established depending on the range between two mesh nodes. As the mesh network increases and decreases in density, and range and communication aspects change, a communication link may be change between the higher and lower frequency bands as necessary.

19 Claims, 8 Drawing Sheets

SYSTEM AND METHOD FOR ESTABLISHING A WIRELESS MESH NETWORK USING MULTIPLE FREQUENCY BANDS

BACKGROUND OF THE INVENTION

Wireless communication between computing devices is becoming a more prevalent and accepted method for providing network communication. Wireless transmissions however, may have several limitations. One of these limitations is related to a range versus bandwidth trade-off. Range may be very important in wireless communication since the broadcast tower coverage area directly impacts capital equipment cost and how many customers a piece of equipment can cover. Range refers to the limitation where as the connection end point (the client) moves farther from the tower, the signal between the tower and the connection end point degrades.

This problem equally affects mesh networks. A mesh network is a network topology in which mesh nodes are connected by self-forming connections as the mesh nodes enter the network. The range of the mesh nodes is limited by the technology used by the mesh node for transmission. Certain technologies take advantage of frequencies that provide increased bandwidth at the cost of range in the signal. With these technologies, it may not be possible to achieve the densities required in order to form a house-to-house wireless link without the use of expensive antenna technologies or boosting the transmit power beyond the FCC limits. Accordingly, other solutions for establishing a mesh network are needed.

SUMMARY OF THE INVENTION

Embodiments of the present invention relate to a system and method for establishing a wireless mesh network using multiple frequency bands to allow early mesh formation given sparse participation. The present invention provides an inexpensive and automated method for working around the limits of readily-available technologies that transmit using higher frequencies (e.g., 2.4 GHz, 5 GHz, etc.) until a neighborhood achieves a density that supports these higher frequency transmissions.

In one aspect of the present invention, a self-forming neighborhood mesh network is built that takes advantage of existing 802.11 standard communication hardware, which currently communicates at 2.4 GHz or 5 GHz. As the standards change over time, these frequencies may also change. Using existing standards provides a cost effective method of communication, as the hardware is produced in massive quantities and is readily available. However, for a mesh network, as a mesh node (i.e., mesh box) requires other radios in range in order to form the mesh network. For certain applications, the practical range of standard 802.11 radios in an outdoor house-to-house environment is about 30 meters. In a typical suburban neighborhood, homes located next to each other may exceed this range. With the limited range of 802.11 communication, forming a viable mesh network would require that a huge percentage of the homes in a typical neighborhood be equipped with the mesh boxes.

The present invention therefore provides embodiments related to using a lower band of the spectrum (e.g., a band below 1 GHz) to initiate the mesh network. Using a lower band of the spectrum provides much greater range, and thus requires fewer homes be equipped with the mesh boxes initially for the mesh network to form. In one aspect of the present invention, as participating home density increases, the mesh network automatically switches specific links in the mesh network to the higher spectrum provided by the 802.11 standard in order to provide higher bandwidth. This allows a viable mesh network to scale from a very low installed population base to a fully mature mesh network.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
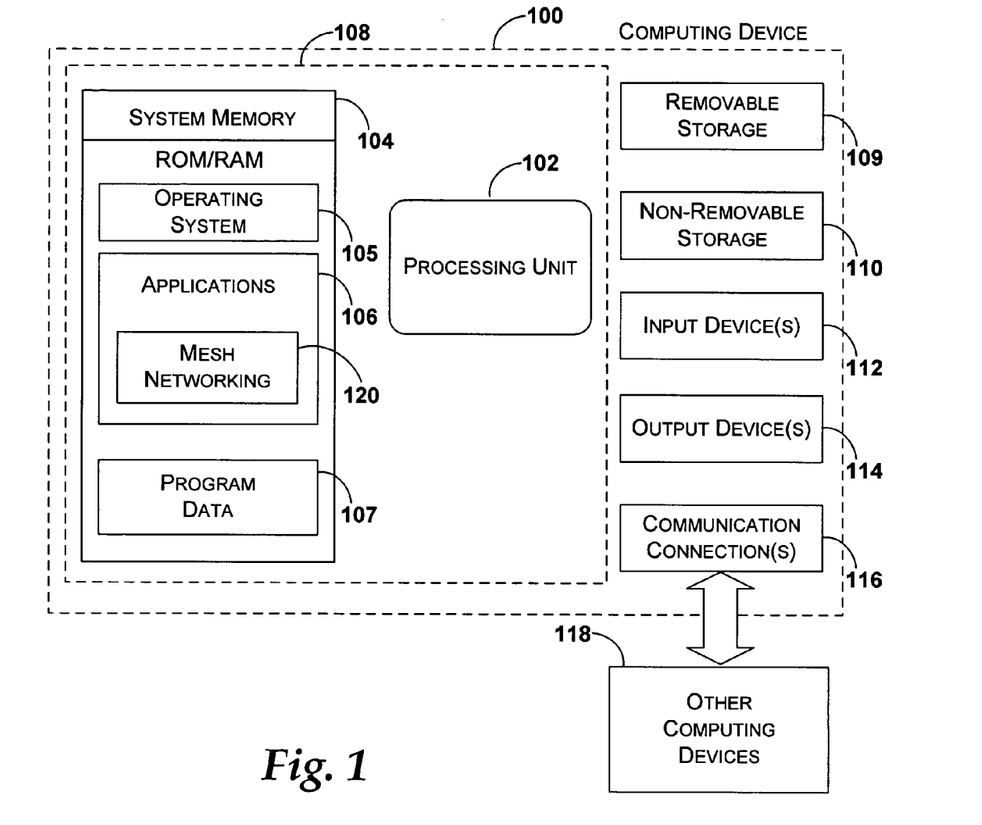
FIG. 1 illustrates an exemplary computing device that may be used in one exemplary embodiment of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one embodiment, applications 106 further includes an application 120 for implementing mesh networking functionality in accordance with the present invention. The functionality represented by application 120 may be further supported by additional input devices, 112, output devices 114, and communication connection(s) 116 that are included in computing device 100 for establishing and maintaining a mesh network.

Figure 2:
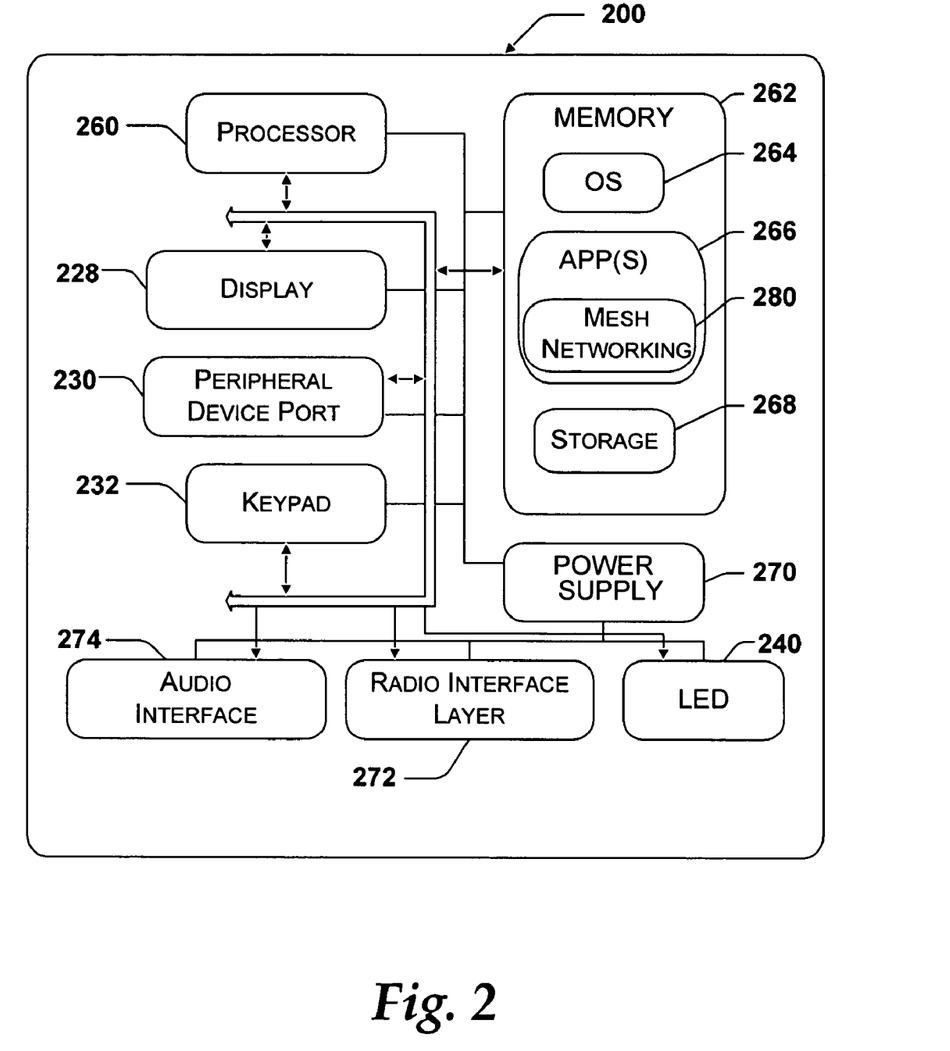
FIG. 2 illustrates an exemplary mobile device that may be used in one exemplary embodiment of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has a processor 260, a memory 262, a display 228, and a keypad 232. The memory 262 generally includes both volatile memory (e.g., RAM) and non-volatile memory (e.g., ROM, Flash Memory, or the like). The mobile computing device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 is shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving communications, such as radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

In one embodiment, applications 266 further includes an application 280 for implementing mesh networking functionality in accordance with the present invention. The functionality represented by application 280 may be further supported by structure in radio interface layer 272 that are included in mobile device 200 for establishing and maintaining a mesh network.

Figure 3:
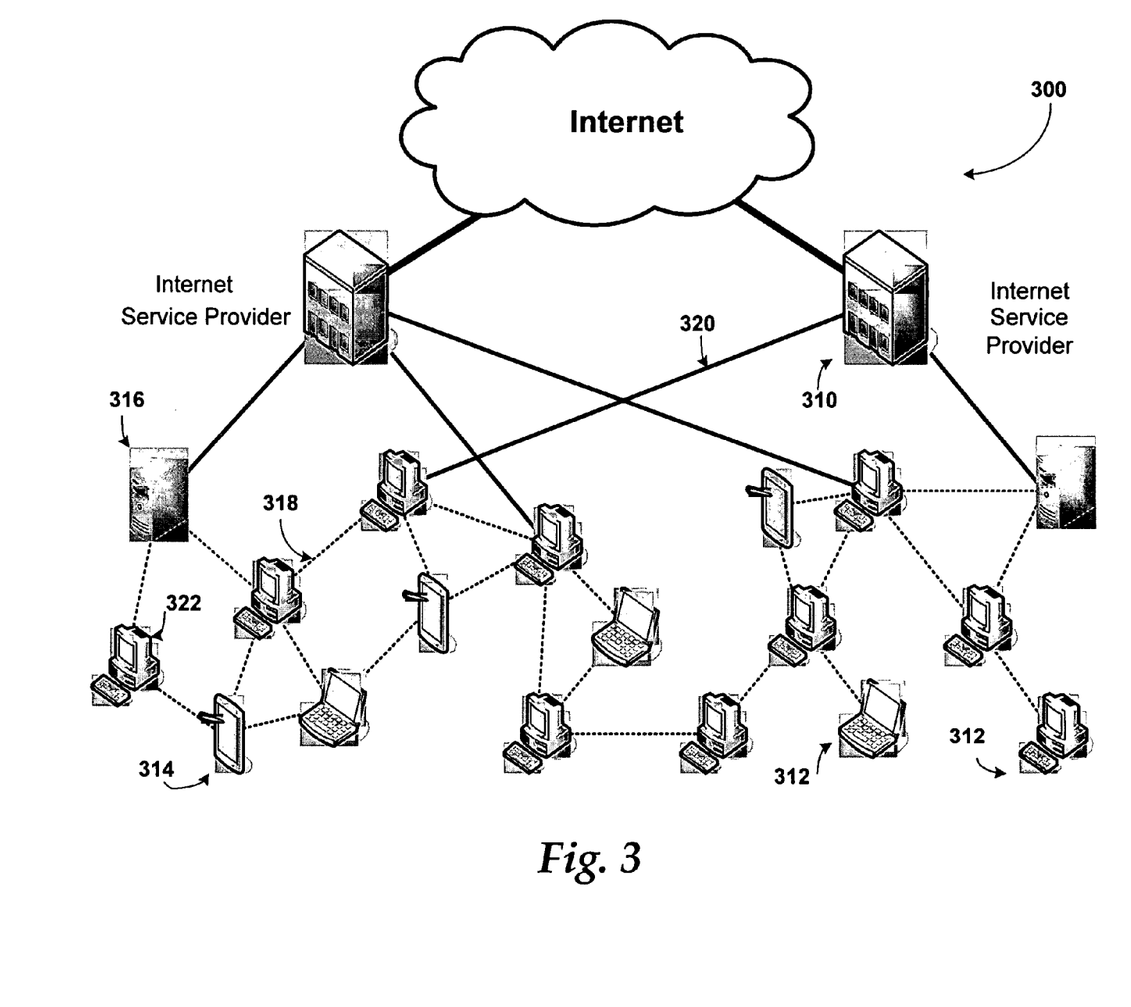
FIG. 3 illustrates an exemplary mesh network that may be used in one exemplary embodiment of the present invention.

FIG. 3 illustrates a mesh network 300 that may be used in one exemplary embodiment of the present invention. Mesh network 300 may comprise any topological schema of mesh nodes, internet service providers and communication media. Also, mesh network 300 may have a static or dynamic topology without departing from the spirit and scope of the present invention.

Mesh network 300 includes one or more internet service providers 310, which provide internet access points for one or more mesh nodes. A mesh node may comprise any device that is capable of acting as a mesh router. A mesh router refers to any device capable of communicating with other mesh routers and capable of routing data across the mesh network. Each mesh node may transmit and receive data packets and also may pass data packets to other mesh nodes in accordance with the routing protocol of mesh network 300. Each mesh node may be a fixed device or a mobile device. For example, a mesh node may include a computing device 312 that is similar to computing device 100 described above in conjunction with FIG. 1. A mesh node may also include a mobile computing device 314 that may be similar to mobile computing device 200 described above in conjunction with FIG. 2. Other embodiments may include other configurations of mesh nodes. For example, a mesh node may include a dedicated computer that only routes data packets from one mesh node to another such as mesh box 316.

In one exemplary embodiment of the present invention, mesh network 300 has a network topology in which mesh nodes are connected with several redundant connections between the mesh nodes. Mesh network 300 may include a full mesh where every mesh node is connected to every other mesh node in the mesh network. Mesh network 300 may also include a partial mesh topology where some mesh nodes are organized in a full mesh schema and other mesh nodes are only connected to one or two other mesh nodes. Other mesh topologies may include one or more subnets connected to the mesh network. These subnets may have a plurality of clients connected thereto. The various topology schemas for the mesh network 300 are endless and will not be further set forth herein.

Reference number 318 indicates communication media between the mesh nodes. By way of example, and not limitation, communication media 318 may include wired media such as a wired network or direct-wired connection, and wireless media such as acoustic, RF, infrared and other wireless media. Reference number 320 indicates communication media between internet service provider 310 and one or more of the mesh nodes. The communication media 320 may include wired media such as a wired network or direct-wired connection, and wireless media such as acoustic, RF, infrared and other wireless media.

In mesh network 300, mesh nodes may transmit and receive data packets from other mesh nodes and/or from the Internet. Routing tables typically determine what path a data packet traverses through the mesh network. The routing of a data packet is commonly determined at a source node. Stated another way, the node sending a data packet may determine the route a data packet takes through the mesh network. A data packet routed through a mesh node to reach another mesh node is typically referred to as a "hop." For example, if mesh node 314 desires to transmit a data packet to mesh node 316, the routing tables accessible to mesh node 314 may indicate that the optimal path for the data packet is to route the data packet through mesh node 322.

Mesh network 300 represents a mature mesh network with multiple mesh nodes. Although not visually distinguished in FIG. 3, the connection between mesh nodes may be provided according to the high frequency or low frequency solution of the present invention.

Illustrative Embodiments for Establishing a Mesh Network

Embodiments of the present invention are related to using multiple frequencies for establishing a wireless mesh network in accordance with the present invention. Using standard wireless transmission equipment provides an efficient and cost effective method for population a location with the structure for providing a mesh network. However, standard transmission frequencies, which transmit communication data at higher frequencies (e.g., 2.4 GHz, 5 GHz) may not have sufficient transmission ranges when a mesh network is first being created. Higher communication frequencies provide higher bandwidth connections but physics dictates that the signal also attenuates quicker and thus has less range. Lower frequencies are the opposite, achieving greater range at the expense of less bandwidth. Signal propagation distance is inversely proportional to frequency so at equal transmit power doubling the frequency will generally halve the effective range. The present invention takes advantage of the properties of both high frequency and low frequency signals to provide a solution for establishing a mesh network in an area with sparse participation.

Figure 4:
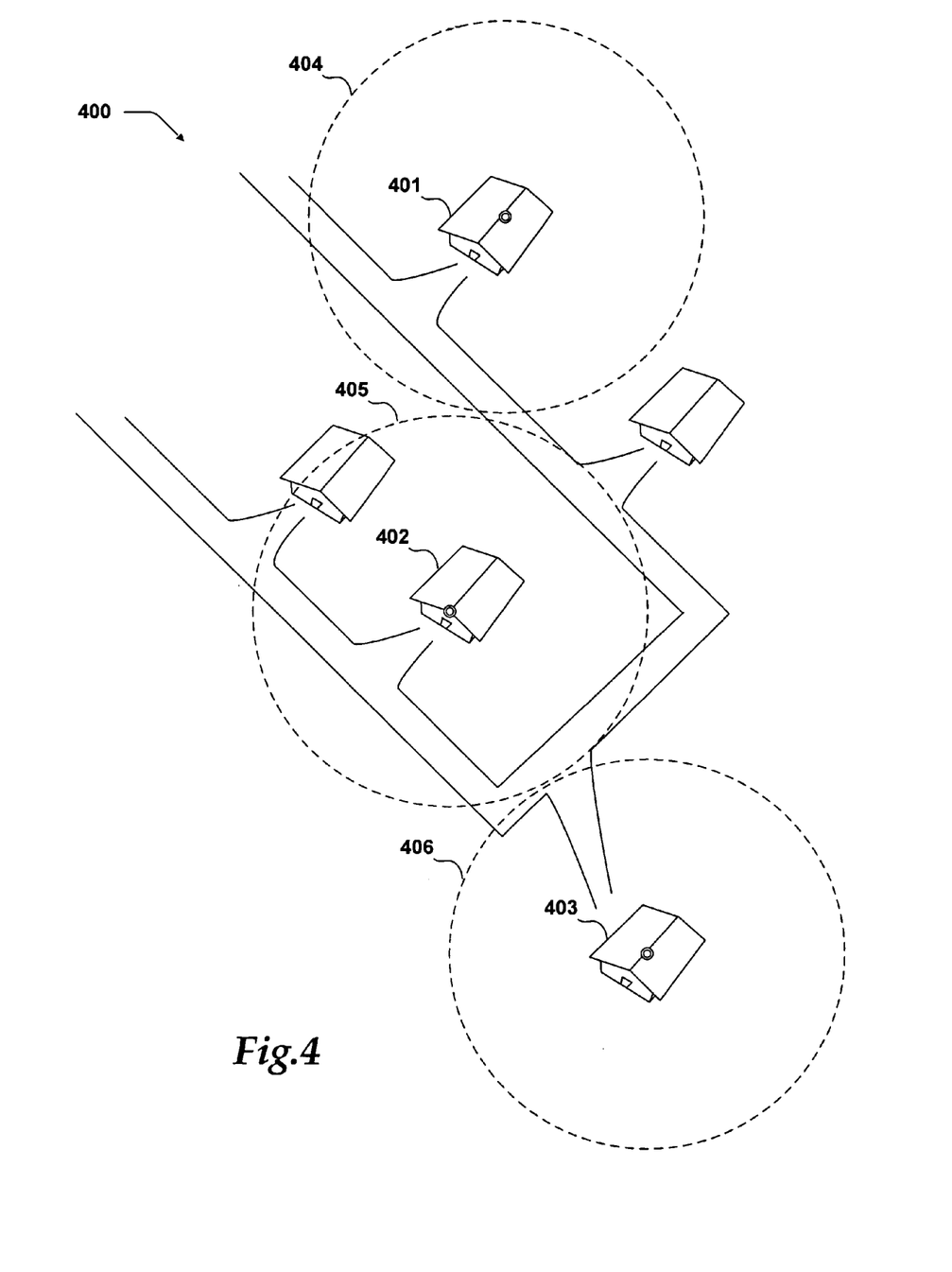
FIG. 4 illustrates an exemplary depiction of a neighborhood that shows ranges for mesh nodes operating a high frequency in accordance with the present invention.

FIG. 4 illustrates an exemplary depiction of a neighborhood that shows ranges for mesh nodes operating a high frequency in accordance with the present invention. Neighborhood 400 includes homes that are operating as mesh nodes (e.g., 401, 402, 403) within the neighborhood. In other embodiments, a neighborhood or other geographical area may only include a single mesh node or none during early formation of a mesh network. Neighborhood 400 is illustrative of a mesh network with sparse participation within a defined geographical area. Other geographical structures and objects (e.g., concrete walls, hills, trees, etc.) not illustrated in FIG. 4 may also affect the range of wireless communication by absorbing signals and causing multi-path reflections.

In the embodiment shown, homes 401, 402, 403 represent mesh nodes. In one example, each of these homes includes a computing devices structured to operate as a mesh box and support a wireless mesh network. In the current example, each of these mesh boxes is operating according to current 802.11 standards. The transmission frequency provided by 802.11 standard communications affects each of the home's range of transmission. While the advertised range of 802.11 (ISM radio) technology is 100 meters, actual ranges may be much less. In the particular embodiment shown, none of the homes is capable of establishing a mesh network communication link with any of the other homes in the neighborhood due to the range limitation (404, 405, 406) of the high frequency transmission of each mesh box.

Other embodiments of the present invention may provide for mesh network formation in other geographical areas such as rural communities, cityscapes, and other types of locations different than the neighborhood shown by example in FIG. 4.

Figure 5:
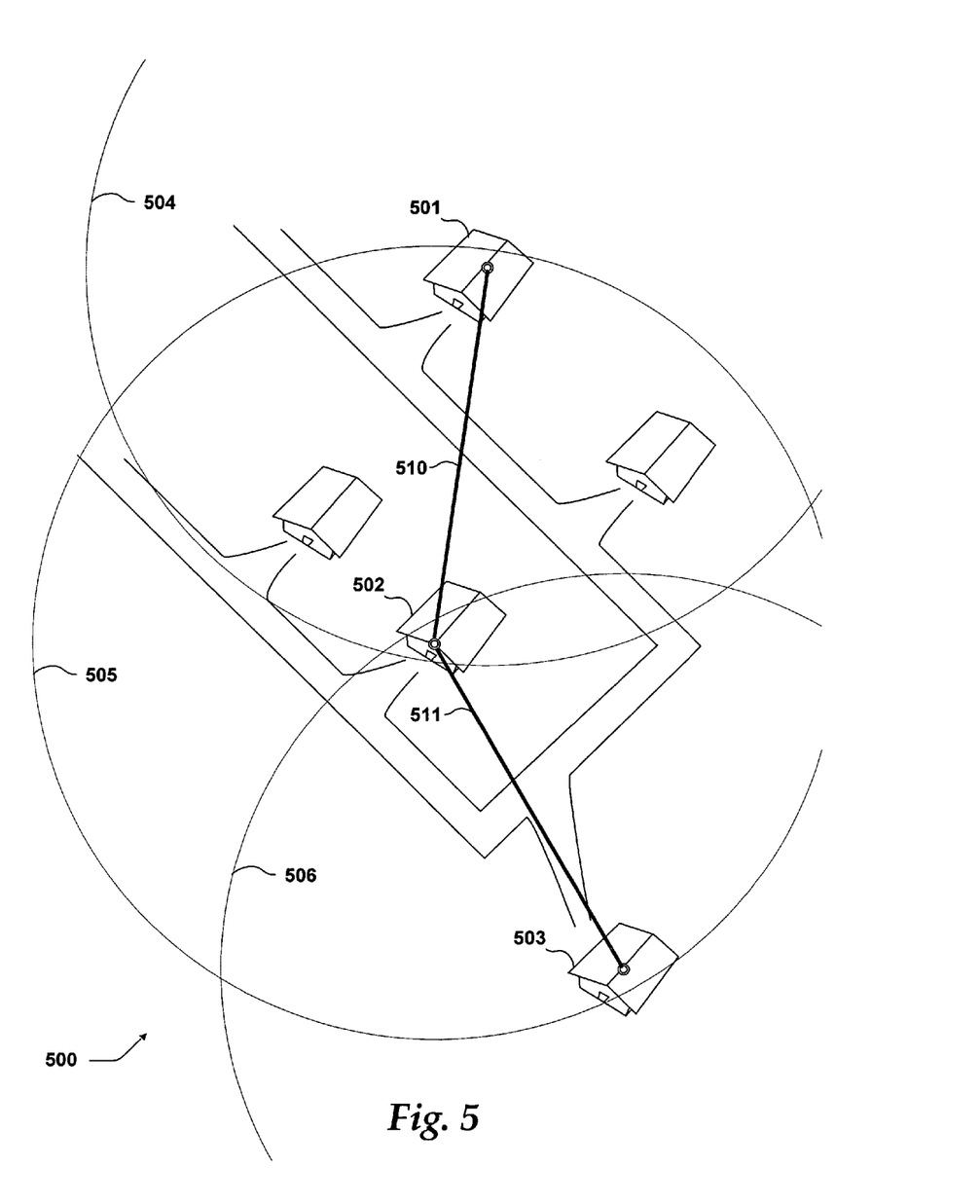
FIG. 5 illustrates an exemplary depiction of a neighborhood that shows ranges for mesh nodes operating at a low frequency in accordance with the present invention.

FIG. 5 illustrates an exemplary depiction of a neighborhood that shows ranges for mesh nodes operating at a low frequency in accordance with the present invention. Neighborhood 500 is illustrative of a mesh network with sparse participation within a defined geographical area.

In the embodiment shown, homes 501, 502, 503 represent mesh nodes. In one example, each of these homes includes a computing devices structured to operate as a mesh box and support a wireless mesh network. Neighborhood 500 is similar to neighborhood 400 shown in FIG. 4, however mesh nodes 501, 502, 503 are operating a lower frequency (e.g., 500-900 MHz) rather than the higher frequency (e.g., 2.4 GHz, 5 GHz) of 802.11 standard communication.

The circles (504, 505, 506) around each of the mesh nodes indicate the expanded range of the lower frequency wireless communication. Links 510 and 511 illustrate that a low-frequency, low-bandwidth mesh connection can form between the mesh nodes using the lower frequency communication. The sample mesh network shown here is formed from only three houses in neighborhood 500. A three house mesh network generally represents a mesh network within a low density neighborhood (i.e., few homes in the neighborhood include operating mesh boxes). However, the present invention, with the increased range provided by the low frequency communication, is still able to provide a viable mesh network even at such a low density.

Figure 6:
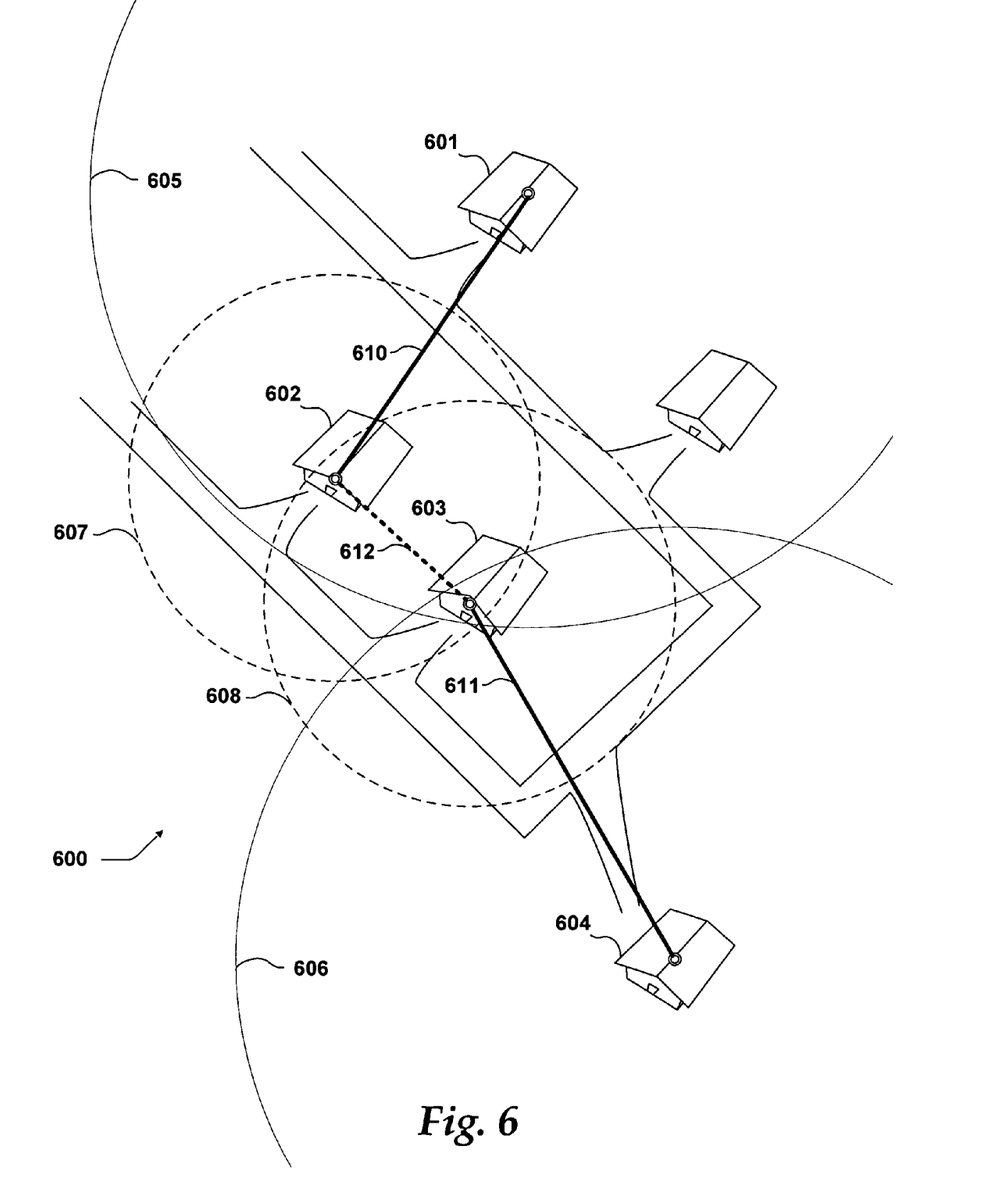
FIG. 6 illustrates an exemplary depiction of a neighborhood representing a mesh network with mesh nodes operating a low and high frequencies in accordance with the present invention.

FIG. 6 illustrates an exemplary depiction of a neighborhood representing a mesh network with mesh nodes operating a low and high frequencies in accordance with the present invention.

In the embodiment shown, homes 601, 602, 603, 604 represent mesh nodes. Neighborhood 600 is similar to neighborhoods 400 and 500 shown in FIGS. 4 and 5, however mesh nodes 601, 602, 603, 604 are operating at both lower frequencies (e.g., 500-900 MHz) and the higher frequencies (e.g., 2.4 GHz, 5 GHz) of 802.11 standard communication. Mesh nodes 602 and 603 are shown with ranges 607 and 608 respectively. Ranges 607 and 608 represent ranges corresponding to the higher frequency communication. As illustrated, mesh nodes 602 and 603 are within range of each other and can establish a higher frequency communication link 612. In contrast, mesh nodes 601 and 604 are shown with ranges 605 and 606 respectively. Ranges 605 and 606 represent ranges corresponding to lower frequency communication since neither mesh node 601 nor mesh node 604 are within high frequency range of another mesh node. Accordingly, mesh nodes 601 and 604 establish low frequency links 610, 611 with other mesh nodes in the mesh network.

A drawback with the lower frequency mesh links (510, 511) as shown in FIG. 5 is that the available bandwidth is significantly less in the lower bands of the spectrum. Accordingly, the present invention does not stay with a 500 MHz or 900 MHz link. While the available bandwidth is being shared amongst a few consumers, the lower-frequency links are a viable solution. As more houses come online and join the network however, range becomes less critical because the client density increases. Bandwidth gains importance with the increased density since more clients talking between each other transfer more data. The present invention provides algorithms for automatically falling over to a higher frequency in order to utilize the higher bandwidth as the density of participants increases. The present invention allows this transition between a lower frequency and higher frequency on a link-by-link basis.

Other embodiments of the invention use other frequencies than those described in the present invention and may include multiple levels of frequencies including frequencies higher than those provided according to 802.11 standards.

Figure 7:
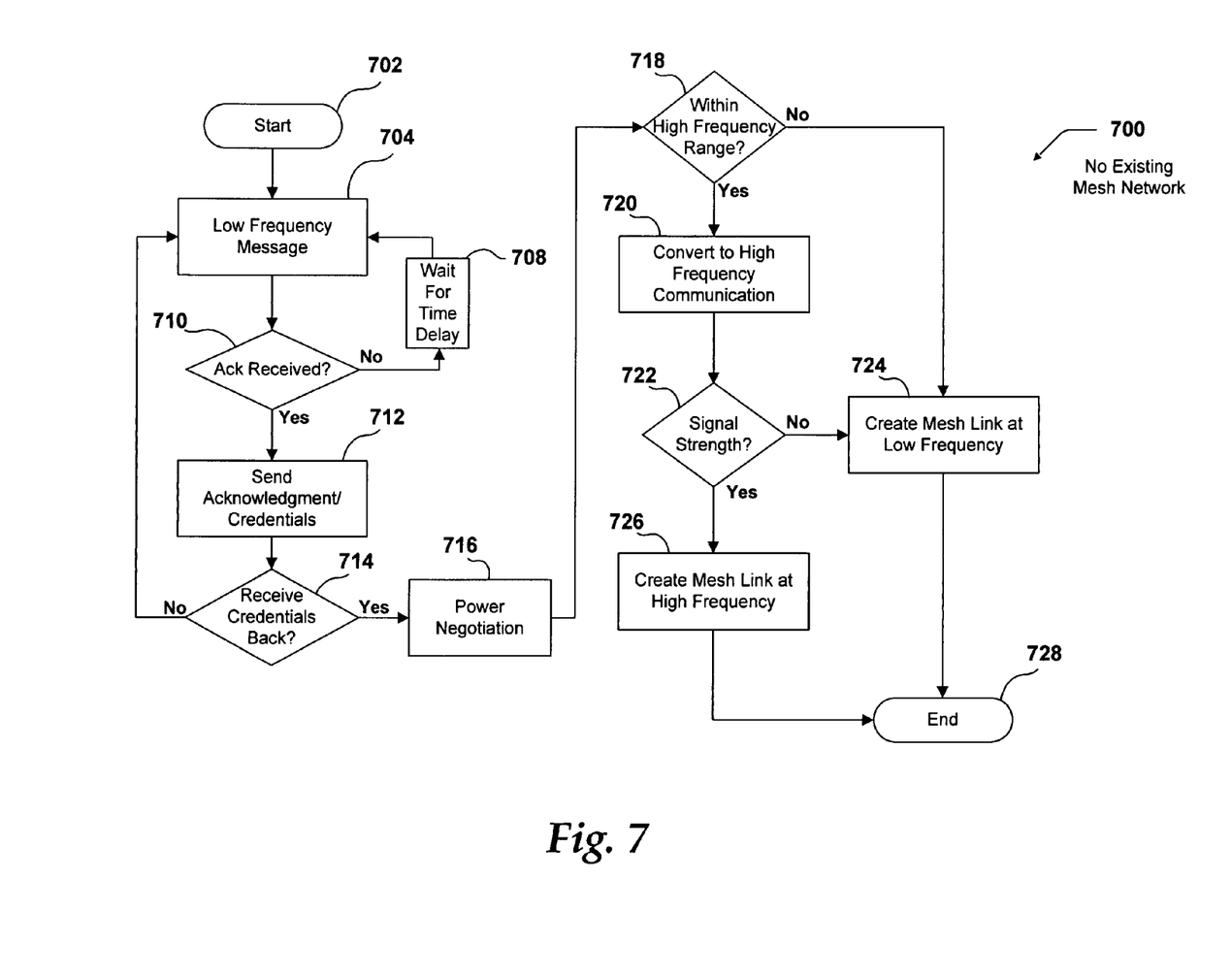
FIG. 7 illustrates a logical flow diagram of a process for initiating a mesh network when no previous mesh network is established in accordance with the present invention.

FIG. 7 illustrates a logical flow diagram of a process for initiating a mesh network when no previous mesh network is established in accordance with the present invention. Process 700 starts at block 702 where the mesh box that corresponds to a mesh node is activated and no mesh network currently exists. The present invention allows for a self-forming mesh network that begins to search the air for neighbors that can join the mesh as soon as it is powered. The consumer needs only to supply power to the device containing the radios and software. Once the mesh node is activated, processing continues at block 704.

At block 704, a low frequency message is emitted by the mesh node. The message is issued on the low-frequency band radio or radios associated with the mesh node. The low-frequency message indicates to any other mesh nodes that the current mesh node is online and looking for another mesh node for communication. Once the low-frequency message is emitted, processing continues at decision block 710.

At decision block, the mesh node listens and determines whether an acknowledgement signal (ACK) is received. In one embodiment, the presence of another mesh node is detected in one of two ways. Either the issued message is responded to, or a message from another mesh node is detected. If no ACK or message is received, processing moves to block 708, where the mesh node waits for a specified time delay before emitting another low-frequency message. However, if an ACK or message is received, processing continues at block 712.

At block 712, the current mesh node sends its own acknowledgment and credentials to the newly discovered mesh node. The acknowledgement corresponds to a packet or packets that contain the mesh node's credentials, using the information contained in the ACK as a return address. These credentials include a security certificate and identify the mesh node sending the credentials as a certified mesh node. Processing continues to decision block 714.

At decision block 714, a determination is made whether credentials from the newly identified mesh node are returned. If the credentials are not returned or are incorrect, processing returns to block 704 where the mesh node starts over and issues another low-frequency message. However, if the credentials are confirmed, processing moves to block 716.

At block 716, a power negotiation is held to determine the distance between the two mesh nodes. The determination provides the data for determining whether to communicate at the higher frequency or the lower frequency. In one embodiment the power and attenuation of a signal is measured and the distance is calculated from these variables. In another embodiment, the mesh nodes attempt communication at both the higher and lower frequency to determine the associated range between the mesh nodes. Once the range between the mesh nodes is determined, processing moves to decision block 718.

At block 718, a determination is made whether the distance between the mesh nodes is within the high frequency range. In one embodiment, when the range of the mesh node is within a specified threshold (e.g., 50 meters), the mesh node is considered to be within the high frequency range. If the distance between mesh nodes is not within the high frequency range, processing moves to block 724. However, if the distance between mesh nodes is within the high frequency range, processing continues at block 720.

At block 720, the communication between the mesh nodes is switched to the higher frequency band by mutual agreement between the mesh nodes. Processing then continues at decision block 722.

At decision block 722, the signal strength of the communication between the two mesh nodes is tested one more time. If the signal is not acceptable, processing moves to block 724.

At block 724, a mesh link is created between the two mesh nodes at the lower frequency since the higher frequency could not be used. Once the lower frequency mesh link is created, processing reaches a steady-state and processing moves to block 728, where process 700 ends.

However, if the signal is acceptable when the signal strength is tested, processing proceed to block 726. At block 726, a mesh link is created between the two mesh nodes at the higher frequency since the signal strength at the higher band is sufficient. Once the higher frequency mesh link is created, processing reaches a steady-state and processing moves to block 728, where process 700 ends.

Figure 8:
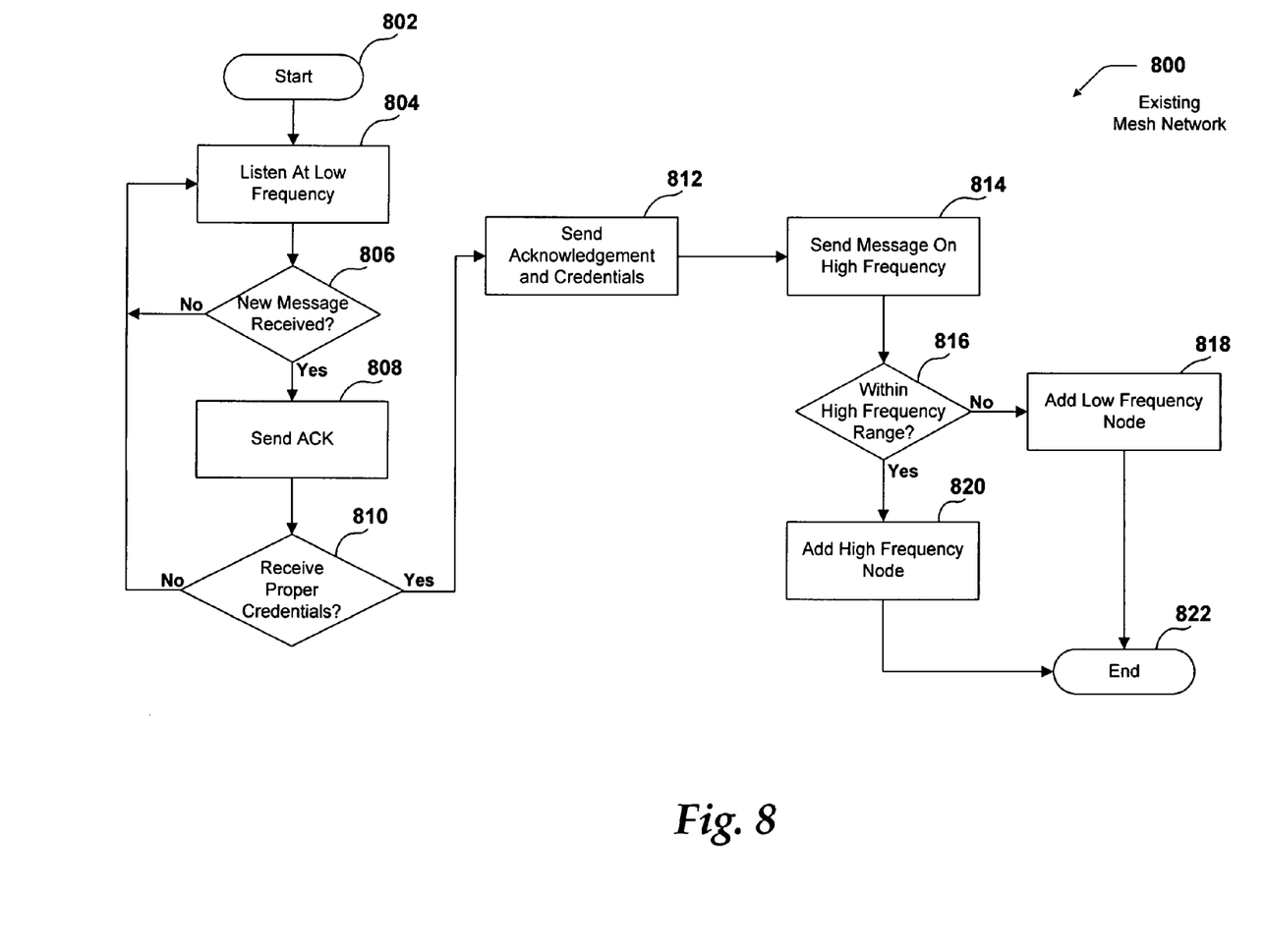
FIG. 8 illustrates a logical flow diagram of a process for initiating communication for a mesh node in an established mesh network in accordance with the present invention.

FIG. 8 illustrates a logical flow diagram of a process for initiating communication for a mesh node in an established mesh network in accordance with the present invention. Process 800 starts at block 802 where the mesh box that corresponds to a mesh node is activated and a mesh network is currently present. Once the mesh node is activated, processing continues at block 804.

At block 804, while the new mesh node is activated, the mesh network is listening for a new message at the low frequency. The activation of the mesh node sends out a new message. Processing continues at block 806.

At block 806, a determination is made whether the existing mesh network has received the new message from the newly activated mesh node. If no new message is received, processing returns to block 804 where the mesh network continues to listen for a message at the low frequency. However, if a new message is received, processing advances to block 808.

At block 808, an acknowledgment message (ACK) is sent to the newly activated mesh node from one or more of the other mesh nodes in the mesh network. It is possible for a new mesh node to receive multiple ACKs from multiple existing mesh nodes that are all in range and that all heard the new message. Once the ACK is sent, processing moves to decision block 810.

At decision block 810, a determination is made whether the mesh network receives a set of credentials from the new mesh node. These credentials are used to insure that the new mesh node is an authentic mesh node. If the credentials are incorrect or not received, the mesh network drops the conversation and returns to block 804, where the mesh network continues to listen for a new message at the low frequency. Alternatively, if the credentials are correct, processing continues to block 812.

At block 812, the mesh network (i.e., a mesh node on the mesh network) sends its credentials to the new mesh node to insure the new mesh node that it is talking to an authentic mesh network. Processing continues at block 814.

At block 814, the node of the mesh network that is establishing communication enters into a low-band high-band negotiation with the new mesh node, and a message is sent to the new mesh node at the high frequency. Once the high-frequency message is sent, processing continues at decision block 816.

At decision block 816, a determination is made based on the high-frequency message whether the new mesh node is within range of the mesh node on the existing mesh network for establishing high frequency communication. In one embodiment, when the range of the mesh node is within a specified threshold (e.g., 50 meters), the mesh node is considered to be within the high frequency range. If the new mesh node is not within range, processing moves to block 818, where the new mesh node is added to the mesh network as a low frequency node. Alternatively, if the new mesh node is within range for high frequency communication, processing moves to block 820, where the new mesh node is added to the mesh network as a high frequency node. Once the new mesh node is added to the mesh network, processing proceeds to block 822, where process 800 ends.

In one embodiment, process 800 may be repeated for the various mesh nodes on the existing mesh network and low or high frequency mesh links may be established between each of these mesh nodes and the new mesh node.

In another embodiment, the communication link between two mesh nodes may change between the higher and the lower frequency bands as necessary from changes in density of the mesh network, changes in geography, and other changes that affect communication.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for establishing a wireless mesh network, comprising:
when the wireless mesh network comprising mesh nodes has sparse participation within a defined geographical area; each of the mesh nodes initially determining whether other mesh nodes within the wireless mesh network are within a range using a first transmission frequency that has a larger range of transmission and a lower bandwidth as compared to a range of transmission and a bandwidth of a second transmission frequency; wherein the first transmission frequency is a lower frequency as compared to the second transmission frequency; wherein a first mesh node of the mesh nodes is configured to communicate with other mesh nodes on the wireless mesh network and receive, transmit and route packets to other mesh nodes on the network;
each of the mesh nodes establishing a network communication link with the other mesh nodes of the wireless mesh network that are within range using the first transmission frequency;
changing an established network communication link from the first transmission frequency to the second transmission frequency between mesh nodes based at least in part upon a determination of an increase of density of the wireless mesh network; and
transitioning to a third transmission frequency when the range to at least one of the other mesh nodes is between a specified threshold and another threshold.

2. The computer-implemented method of claim 1, further comprising sending a message from a mesh node using the first transmission frequency when the mesh node is activated.

3. The computer-implemented method of claim 1, wherein establishing the network communication link further comprises sending an acknowledgement message from a mesh node in response to a message from one of the other mesh nodes.

4. The computer-implemented method of claim 1, further comprising receiving credentials from a mesh node to confirm that the mesh node is authentic.

5. The computer-implemented method of claim 1, further comprising checking signal strength of the network communication link after transitioning to a second transmission frequency.

6. The computer-implemented method of claim 1, wherein the first transmission frequency corresponds to a low transition frequency and the second transmission frequency corresponds to a high transmission frequency.

7. The computer-implemented method of claim 1, wherein the first transmission frequency corresponds to a frequency of 500-900 MHz and the second transmission frequency corresponds to an 802.11 standard transmission frequency.

8. The computer-implemented method of claim 1, further comprising establishing a mesh link at the first frequency when the range is not within a specified threshold.

9. The computer-implemented method of claim 1, further comprising establishing a mesh link at the second frequency with a mesh node when the range to the mesh node is within a specified threshold.

10. A computer-readable storage medium excluding signals that includes computer-executable instructions for establishing a wireless mesh network, the instructions comprising:
when the wireless mesh network comprising mesh nodes has sparse participation within a defined geographical area; initially transmitting a first message by each of the mesh nodes according to a first transmission frequency to determine when other mesh nodes are available for communication with each of the mesh nodes; wherein the first transmission frequency has a larger range of transmission and a lower bandwidth as compared to a range of transmission and a bandwidth of a second transmission frequency; wherein each of the mesh nodes are configured to communicate with other mesh nodes on the wireless mesh network and receive, transmit and route packets to other mesh nodes on the network;

each of the mesh nodes, performing actions, comprising:

determining whether a second mesh node among the other mesh nodes is within a range of the mesh node using the first transmission frequency;

initially establishing network communication between the mesh node and the second mesh node using the first transmission frequency;

changing to the second transmission frequency based at least in part upon a determination of an increase of density of the wireless mesh network; and transitioning to a third transmission frequency.

11. The computer-readable storage medium of claim 10, further comprising waiting for a specified time delay before transmitting a second message when other mesh nodes are not located by the first message.

12. The computer-readable storage medium of claim 10, wherein establishing network communication further comprises sending an acknowledgement message in response to the first message.

13. The computer-readable storage medium of claim 10, further comprising checking signal strength of the network communication between a mesh node and the second mesh node after transitioning to a second transmission frequency.

14. The computer-readable storage medium of claim 10, wherein the first transmission frequency corresponds to a low transition frequency and the second transmission frequency corresponds to a high transmission frequency.

15. A system for expanding the range of a mesh network, comprising:

a first mesh node that is configured to initially transmit data according to a first transmission frequency to establish a link with other mesh nodes within the mesh network that are within a range of the first transmission frequency; wherein the first transmission frequency has a larger range of transmission and a lower bandwidth as compared to a range of transmission and a bandwidth of a second transmission frequency; wherein the first mesh node is configured to communicate with other mesh nodes on the wireless mesh network and receive, transmit and route packets to the other mesh nodes on the network;

a second mesh node that is configured to transmit data according to the first transmission frequency to establish a link with other mesh nodes within the mesh network that are within a range of the first transmission frequency and the second transmission frequency in response to a change in density of the mesh nodes of the mesh network; and a third mesh node that is configured to transmit data according to the first transmission frequency to establish a link with other mesh nodes within the mesh network that are within a range of the first transmission frequency and the second transmission frequency in response to a change in density of the mesh nodes of the mesh network; wherein at least one of: the first mesh node; the second mesh node; and the third mesh node transitioning to a third transmission frequency based at least in part on a range determination.

16. The system of claim 15, wherein the first mesh node and the second mesh node are further configured to send credentials to one another to confirm that each mesh node is authentic.

17. The system of claim 15, wherein at least two of the first mesh node, the second mesh node and the third mesh node are further configured to send an acknowledgement message to one another in response to a message.

18. The system of claim 15, wherein at least two of the first mesh node, the second mesh node and the third mesh node are further configured to check a signal strength of the network communication after transitioning to a second transmission frequency.

19. The system of claim 15, wherein the first transmission frequency corresponds to a low transition frequency and the second transmission frequency corresponds to a high transmission frequency.

* * * * *